(12) United States Patent
Park et al.

(10) Patent No.: US 6,669,285 B1
(45) Date of Patent: Dec. 30, 2003

(54) HEADREST MOUNTED VIDEO DISPLAY

(76) Inventors: Eric Park, 19610 Searls Dr., Rowland Heights, CA (US) 91748; Jung Ho Son, 26709 W. Wyatt La., Stevenson Ranch, CA (US) 91381

( * ) Notice: Subject to any disclaimer, the term of this patent is extended or adjusted under 35 U.S.C. 154(b) by 0 days.

(21) Appl. No.: 10/188,662

(22) Filed: Jul. 2, 2002

(51) Int. Cl.[7] .............................. B60R 11/02; A47C 7/72
(52) U.S. Cl. .................................................. 297/217.3
(58) Field of Search ........................ 297/217.1, 217.3, 297/188.04, 188.05

(56) References Cited

U.S. PATENT DOCUMENTS

| | | | | |
|---|---|---|---|---|
| 3,019,050 A | * | 1/1962 | Spielman | ................. 297/217.3 |
| RE33,423 E | | 11/1990 | Lobanoff | |
| 5,267,775 A | * | 12/1993 | Nguyen | .................... 297/217.3 |
| 5,507,556 A | * | 4/1996 | Dixon | ...................... 297/217.3 |
| 5,566,224 A | | 10/1996 | Azam et al. | |
| 5,713,633 A | | 2/1998 | Lu | |
| 6,045,181 A | * | 4/2000 | Ikeda et al. | ............. 297/216.12 |
| 6,394,551 B1 | * | 5/2002 | Beukema | .................... 297/391 |
| 6,406,334 B2 | * | 6/2002 | Chu | ........................ 297/217.3 |
| 2003/0025367 A1 | * | 2/2003 | Boudinot | .................. 297/217.3 |
| 2003/0107248 A1 | * | 6/2003 | Sanford et al. | .......... 297/217.3 |

* cited by examiner

*Primary Examiner*—Peter R. Brown
(74) *Attorney, Agent, or Firm*—Chan Law Group LC

(57) ABSTRACT

The invention resides in a pre-fabricated OEM replacement vehicle headrest with a built-in active matrix TFT LCD monitor. The data input cable is run through the seat, through a hollow headrest support tube and into the monitor. The headrest device eliminates the need to modify the original equipment headrests to accommodate the monitor and thereby reduce its safety capabilities.

1 Claim, 6 Drawing Sheets

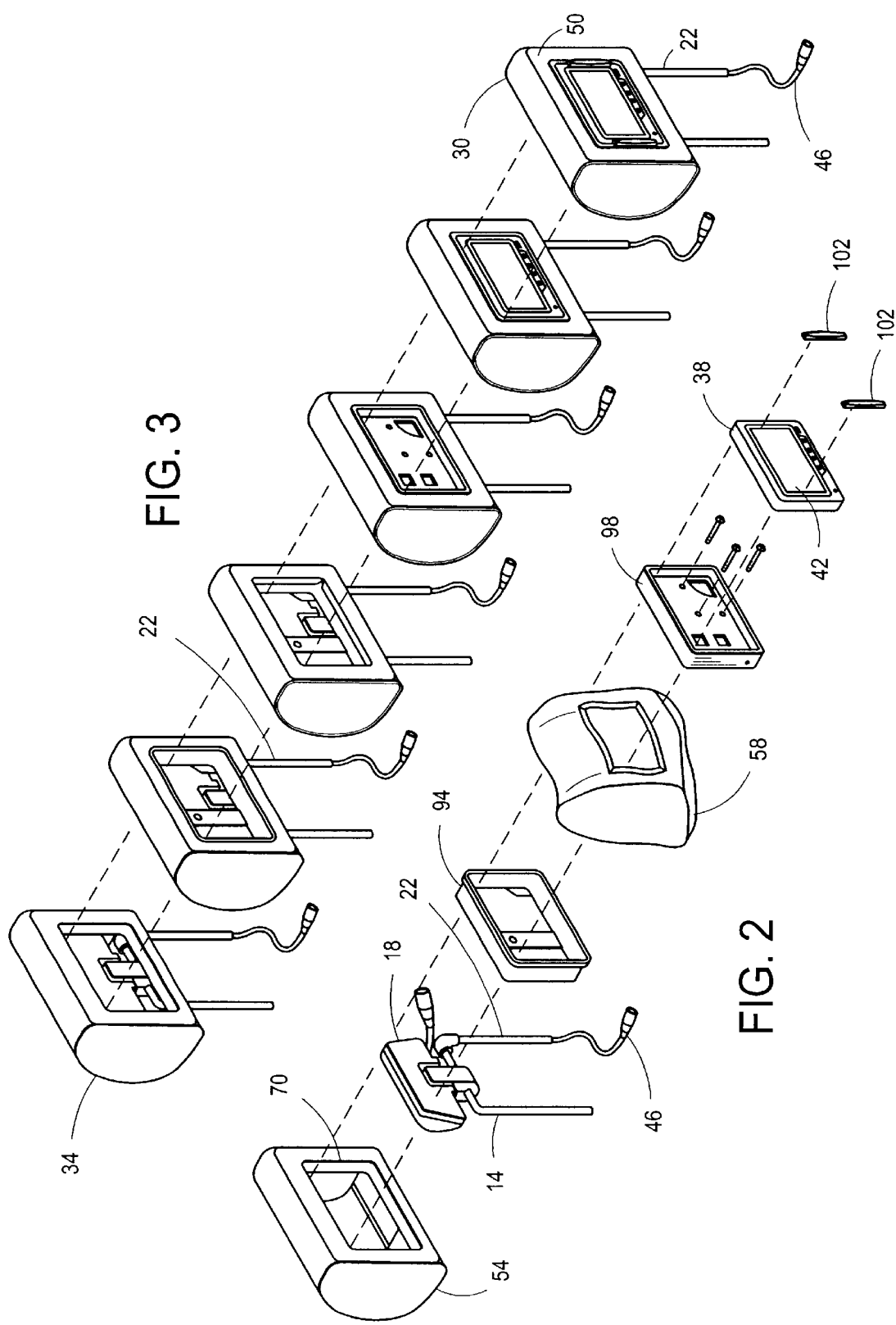

HEADREST MOUNTED VIDEO DISPLAY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

FIELD OF INVENTION

The present invention relates generally to the field of vehicle accessories and more particularly to the field of an OEM replacement vehicle headrest with a built-in LCD display.

BACKGROUND OF THE INVENTION

The automobile has replaced the dining room as the family gathering place. A typical parent, often referred to by the expression Soccer mom, is often shuttling children from one event or function to another. Families are purchasing larger vehicles to accommodate the family's needs. This has resulted in a dramatic rise in the number of sport-utility-vehicles (SUV's) sold in the United States. SUV sales account for almost half of the new automobiles sold in this country. Passengers are spending an increasing amount of time in their automobiles.

The demands of modern society have made two income families the norm rather than the exception. One or both parents may be commuting to work on a regular basis. The search for affordable housing has forced many people to live great distances from their place of employment resulting long commutes. These two factors, along with many others, have resulted in commuters spending ever-increasing amounts of time driving to and from work. Many commuters have discovered that car-pooling to share the driving responsibilities and expenses and to take advantage of the time saving features of the car pool lanes reduces the chore associated with driving to work. As society becomes more urbanized, the time spent commuting by automobile continues to increase. Passengers are spending an increasing amount of time in their automobiles.

The time spent commuting passes more quickly for the passengers when the are engaged. Increasingly, vehicles have become equipped with audio and video equipment intended to keep the passengers engaged while commuting. The passengers can now interact with the Internet, work on a computer, play video games or watch video entertainment. Manufacturers have equipped passenger vehicles, for several years, with video entertainment systems. Large vehicles, such as vans or SUV's often have video monitors hanging from the roof, mounted in the dashboard or center armrest or mounted in the back a the headrest or seat.

A craftsman modifies the backside of the original equipment headrest to receive an OEM video monitor. This is a very expensive procedure and results in a permanent change to the headrest. The modification may also seriously degrade the safety features of the headrest.

What is needed is a reasonably priced, OEM headrest restraint made specifically for the vehicle maintaining the safety requirements of the headrest while incorporating a rearward facing video monitor.

BRIEF SUMMARY OF THE INVENTION

The invention resides in a pre-fabricated OEM replacement vehicle headrest with a built-in active matrix TFT LCD monitor. The vehicle headrest with built in display device includes a frame. The frame has a headrest support and at least one hollow engagement post. The at least one hollow engagement post attaches the headrest support to the seat.

A headrest pillow is attached to the frame. The headrest pillow has a rearward structure and a yielding forward structure sized, shaped and located to prevent the back of the seat occupant's head from a sudden, whipping rearward motion. The headrest pillow is attached to the frame.

A display monitor is provided. The display monitor has a display screen and a combination power and video input cable. The rearward structure of the headrest pillow is sized and shaped to accommodate the display monitor.

A power and video input cable runs through the at least one hollow engagement post to give the headrest a cleaner appearance.

In a variant of this invention, the at least one hollow engagement post has a means that allows it to be adjusted vertically to a plurality of vertical positions in relation to the seat on which it is mounted.

In another variant of this invention, the combination power and video input cable is run up through the seat, through the at least one hollow engagement post and connected into the display monitor.

In yet another variant of this invention, the headrest pillow includes a shaped foam pad covered by a material similar in appearance, color and texture to the material covering the seat onto which it is mounted.

In again another variant of this invention, the display monitor is an active matrix TFT LCD monitor.

In a variation of this invention, the frame has two engagement posts with at least one post being hollow.

In still another variant of this invention, the hollow engagement post is fabricated from chrome-moly tubing.

In another variation of this invention, the headrest support can be tilted in relation to the at least one hollow engagement post to three forward tilt positions. Each forward tilt position is locked into place by a ratcheting mechanism.

In yet again another variation of this invention, the rearward structure of the headrest pillow contains an opening. The opening has a first side, a second side, a third side, a fourth side and a fifth side.

In even another variation of this invention, a headrest housing is sized and shaped to fit snuggly within the opening in the headrest pillow. The headrest housing may be fabricated from ABS plastic.

In yet another variation of this invention, a monitor attachment bezel is mounted into the headrest housing. The display monitor is attached to the monitor attachment bezel.

In again another variation of this invention, the display monitor is attached to the monitor attachment bezel by two brackets.

In yet another variation of this invention, the combination power and video input cable is a DIN cable. A DIN Cable is commonly used for audio and control applications. The DIN cable can be a 5-pin DIN cable or an 8-pin DIN cable.

The foregoing has outlined the more pertinent and important features of the present invention in order that the detailed description of the invention that follows may be better understood so the present contributions to the art may be more fully appreciated. Additional features of the present invention will be described hereinafter, which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only:

FIG. 2 is an exploded perspective view of the components of the vehicle headrest with a built in display device;

FIG. 3 is a perspective view of the assembly order of the components of the vehicle headrest with a built in display device;

DETAILED DESCRIPTION

Figure 1:
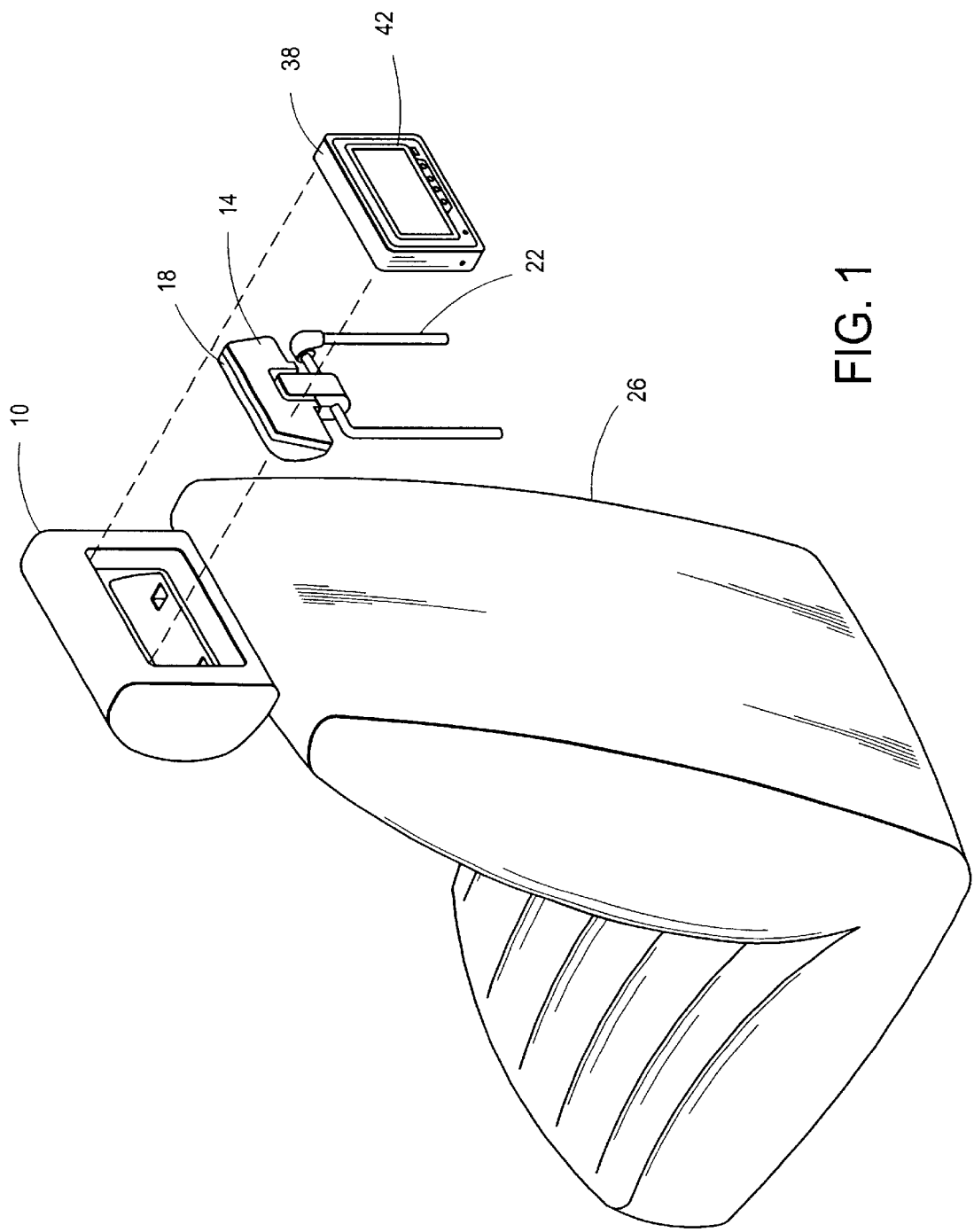
FIG. 1 is a perspective view of a passenger seat with the vehicle headrest with a built in display device.
Figure 4:
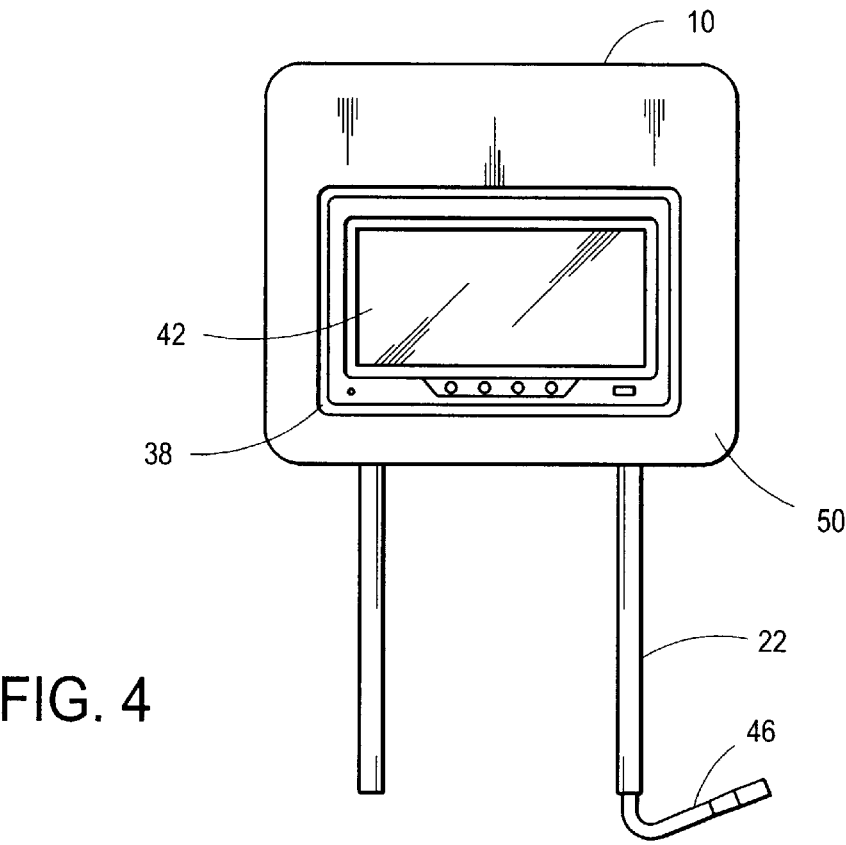
FIG. 4 is a rear elevation view of the vehicle headrest, normal to the monitor display screen.
Figure 5:
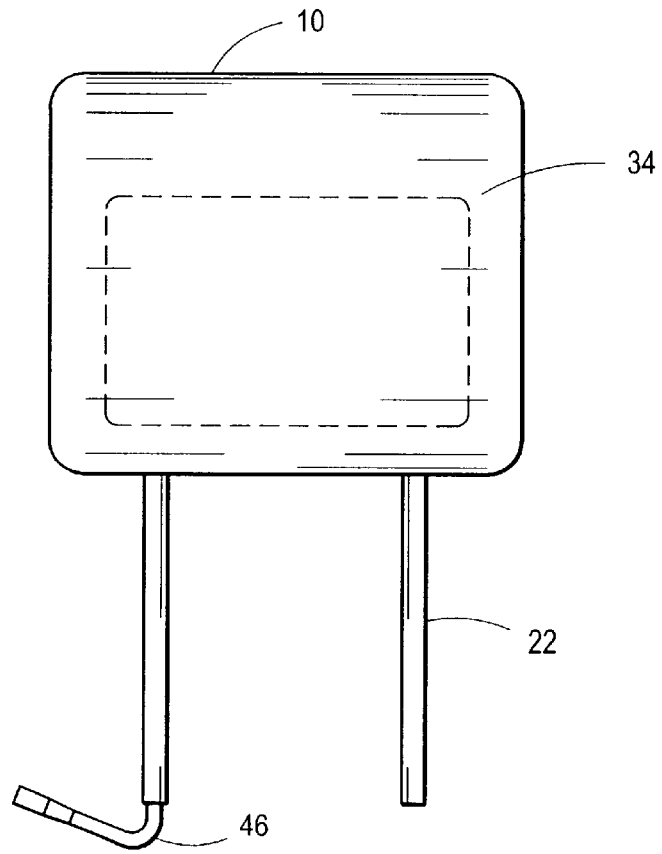
FIG. 5 is a front elevation view of the vehicle headrest with a built in display device.

The invention resides in a pre-fabricated OEM replacement vehicle headrest with a built-in active matrix TFT LCD monitor. As shown in FIGS. 1–3, the vehicle headrest with built in display device includes a frame 14. The frame 14 has a headrest support 18 and at least one hollow pillar 22. The at least one hollow pillar 22 attaches the headrest support 18 to the seat 26.

A headrest pillow 30 is attached to the headrest support 18. The headrest pillow 30 has a rearward structure 50 and a yielding forward structure 34 sized, shaped and located to prevent the back of the seat occupant's head from a sudden, whipping rearward motion. The headrest pillow 30 is attached to the frame 14. The rearward structure 50 of the headrest pillow 30 being sized and shaped to house a display device 38. The display device 38 has a display screen 42 and a combination power and video input cable 46.

As shown in FIGS. 2–9 and 11, the power and video input cable 46 runs through the at least one hollow pillar 22.

In a variant of this invention, the at least one hollow pillar 22 has a vertical adjustment mechanism permitting it to adjust to a plurality of vertical positions in relation to the seat 26 on which it is mounted.

In another variant of this invention, the combination power and video input cable 46 is run up, or extends, through the seat 26, through the at least one hollow pillar 22 to connect to the display device 38.

In yet another variant of this invention, shown in FIGS. 2 and 3, the headrest pillow 30 includes a shaped foam pad 54 covered by a material 58 similar in appearance, color and texture to the material covering the seat 26 onto which it is mounted.

In again another variant of this invention, the display device 38 is an active matrix TFT LCD monitor.

In a variation of this invention, the frame 14 has two pillars 22 with at least one post being hollow.

Figure 6:
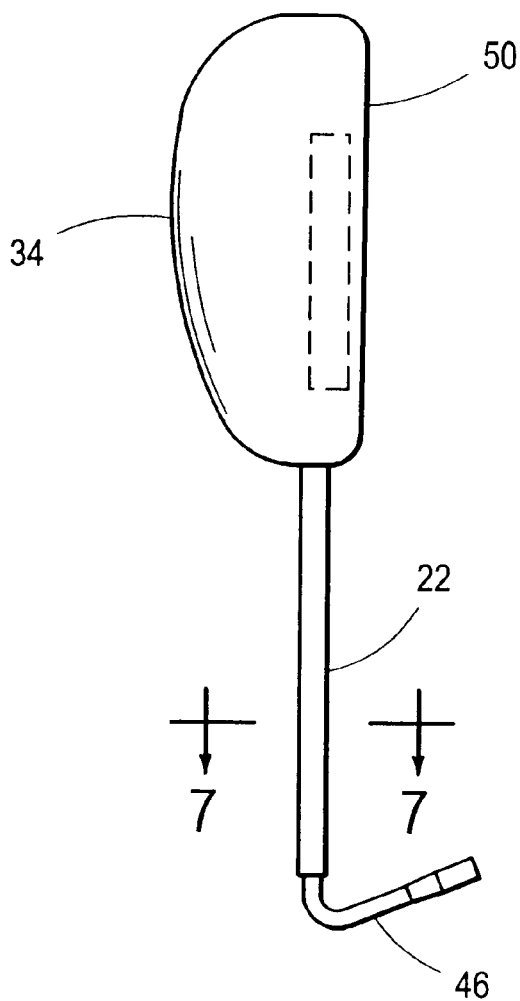
FIG. 6 is a side elevation view of the vehicle headrest with a built in display device.
Figure 7:
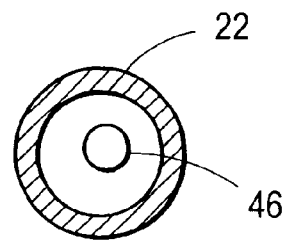
FIG. 7 is a cross-sectional view of a hollow engagement post and DIN cable, the section cut is normal to the centerline of the post.
Figure 8:
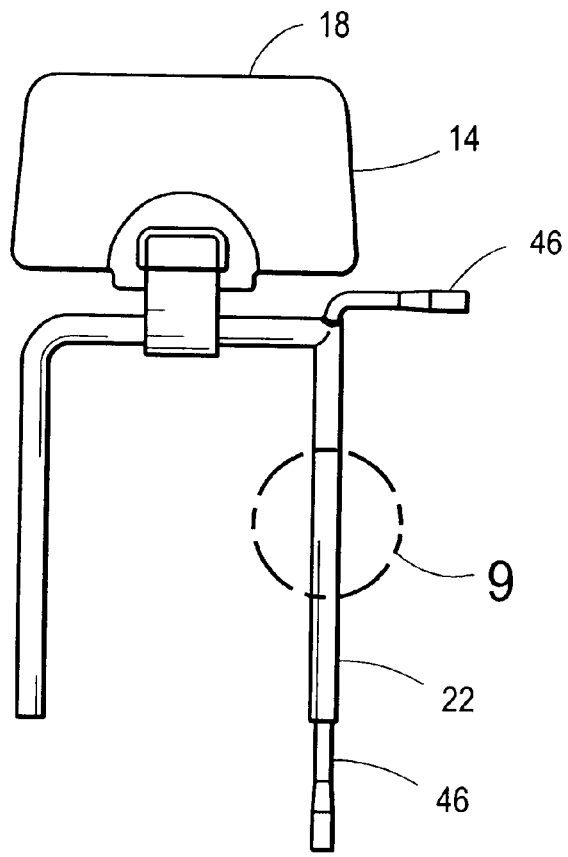
FIG. 8 is a rear elevation view of the headrest support and two engagement posts with at least one engagement post having a din cable run through its hollow interior.
Figure 9:
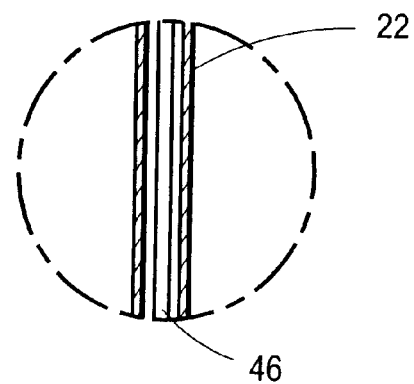
FIG. 9 is a cross-sectional view of a hollow engagement post and din cable, the section cut is parallel to the centerline of the post.

In still another variant of this invention, shown in FIGS. 6 and 7, the hollow pillar 22 is fabricated from chrome-moly tubing.

Figure 10:
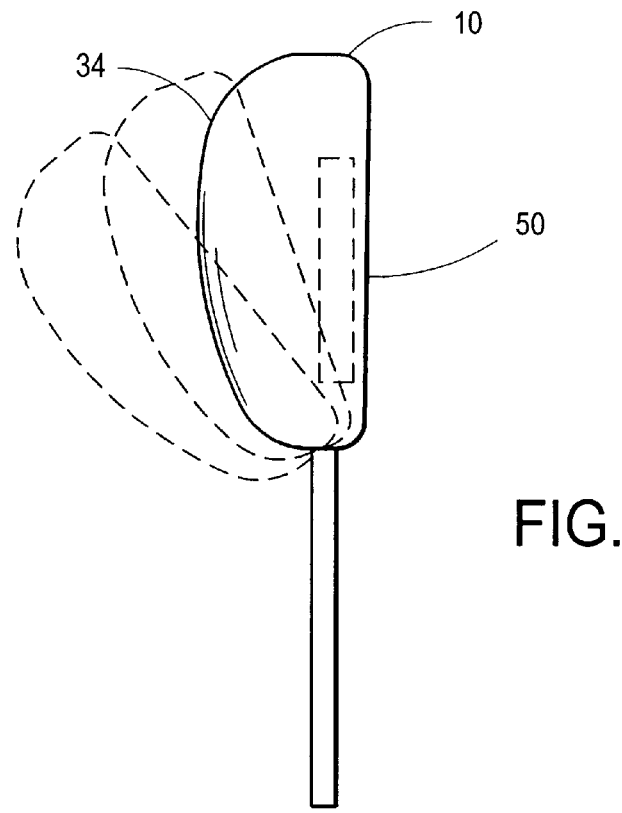
FIG. 10 is a side elevation view of the vehicle headrest with a built in display device illustrating the plurality of forward tilt positions.
Figure 11:
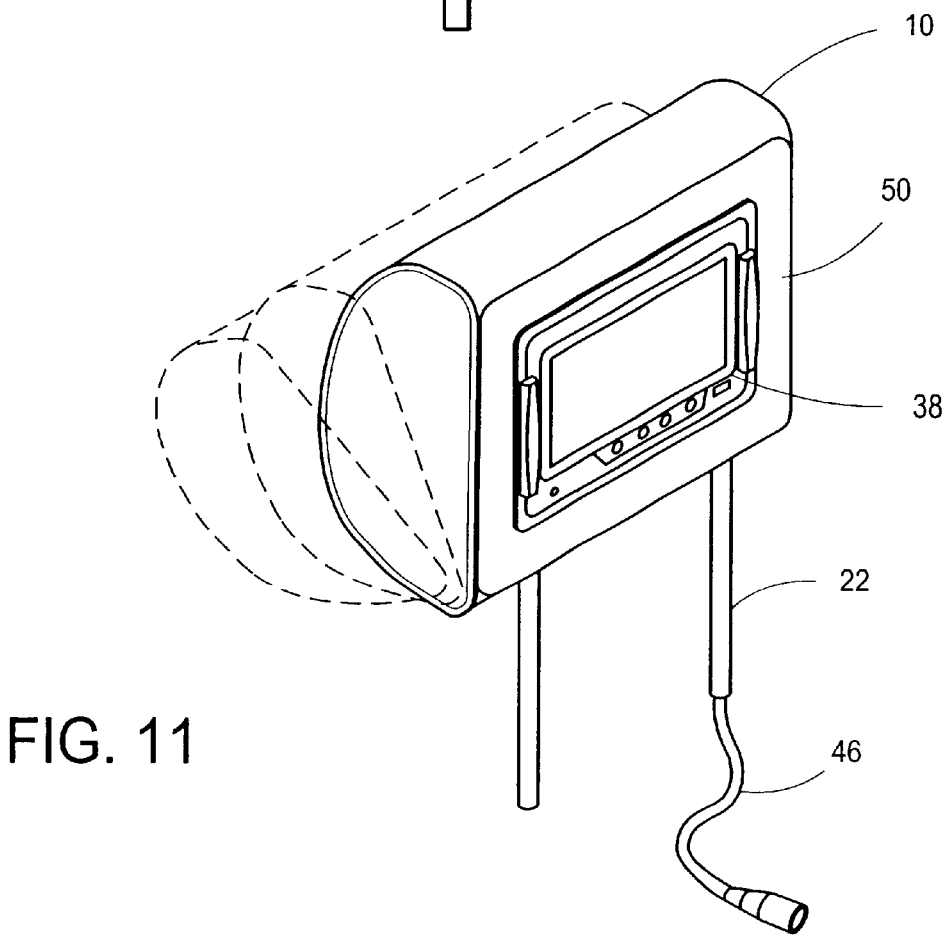
FIG. 11 is a perspective view of the vehicle headrest with a built in display device illustrating the plurality of forward tilt positions.

In another variation of this invention, shown in FIGS. 10 and 11, the headrest support 18 can be tilted in relation to the at least one hollow pillar 22 to three forward tilt positions. Each forward tilt position is locked into place by a ratcheting mechanism.

In yet again another variation of this invention, shown in FIGS. 1–3, the rearward structure 50 of the headrest pillow 30 contains an opening 70. The opening, viewed from the back of the headrest looking forward, has a top side, a bottom side, a right side, a left side and a forward side.

In even another variation of this invention, a video display housing 94 is sized and shaped to fit within the opening 70 in the headrest pillow 30. The video display housing 94 may be fabricated from ABS plastic.

In yet another variation of this invention, a monitor attachment bezel 98 is mounted into the video display housing 94. The display device 38 is attached to the video display housing 94 by the monitor attachment bezel 98.

In again another variation of this invention, the display device 38 is attached to the monitor attachment bezel 98 by two brackets 102.

In yet another variation of this invention, the combination power and video input cable 46 is a DIN cable. A DIN Cable is commonly used for audio and control applications. The DIN cable can be a 5-pin DIN cable or an 8-pin DIN cable.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

What is claimed is:

1. A vehicle headrest with built in display device comprising:
- at least one hollow pillar, said at least one hollow pillar having a vertical adjustment mechanism that allows it to be adjusted vertically to a plurality of vertical positions in relation to the seat on which it is mounted;
- a headrest support, said headrest support being connected to the seat by said at least one hollow pillar, said head rest support being tilt-able in relation to said at least one hollow pillar to a plurality of forward tilted positions, each forward tilted position being locked into place by a ratcheting mechanism;
- a seat;
- a display device, said display device being an active matrix TFT LCD monitor;
- a cable to provide power and video input to said display device, said cable being a DIN cable;
- a display device housing, said headrest housing being sized and shaped to house said display device and fit into said opening in said rearward structure;
- a headrest pillow being attached to said headrest support, said headrest pillow having a shaped foam pad core with a rearward structure and a yielding forward structure and a cover, said yielding forward structure being sized, shaped and located to prevent the back of the seat occupant's head from a sudden, whipping rearward motion, the rearward structure of said headrest pillow being sized and shaped to house said display device housing;
- a monitor attachment bezel, said monitor attachment bezel attaches said display device into said video display housing; and
- said cable extends through said at least one hollow pillar into and through the seat.

* * * * *